United States Patent [19]

Blomley

[11] 4,347,407
[45] Aug. 31, 1982

[54] ELECTRONIC TELEPHONE CIRCUIT

[75] Inventor: Peter F. Blomley, Bishop's Stortford, England

[73] Assignee: International Standard Electric Corporation, New York, N.Y.

[21] Appl. No.: 181,590

[22] Filed: Aug. 27, 1980

[30] Foreign Application Priority Data

Aug. 31, 1979 [GB] United Kingdom ............... 7930246

[51] Int. Cl.³ ............................................ H04M 1/00
[52] U.S. Cl. .................................. 179/81 R; 179/16 F
[58] Field of Search ............... 179/81 R, 81 A, 84 R, 179/16 F; 323/312, 313, 316

[56] References Cited

U.S. PATENT DOCUMENTS 3,973,082  8/1976  van der Plaats ................ 179/81 R
3,989,902  11/1976 Cowpland ....................... 179/81 R

*Primary Examiner*—Joseph A. Popek
*Attorney, Agent, or Firm*—James B. Raden; Marvin M. Chaban

[57] ABSTRACT

A telephone instrument circuit including electronic components for functions such as amplifying incoming and outgoing speech signals. When the electronic transducers of each electronic instruments have to operate in parallel with a carbon microphone in another instrument, problems are likely to arise. To deal with the problem, a voltage regulator is used which includes two essentially series coupled comparator-amplifiers, the first of which is driven by the circuit's supply voltage. The second amplifier has its own reference voltage and its output varies the reference voltage $V_R$ for the first amplifier, whose output is connected to the line whose voltage is being regulated. Above a preset line current, the I-V characteristic of the circuit is almost flat while below the preset threshold it is fairly steep to enable satisfactory parallel operation.

7 Claims, 8 Drawing Figures

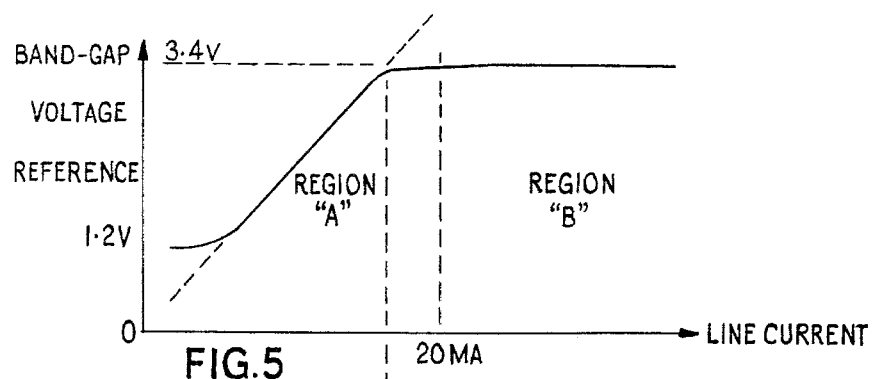
FIG.5
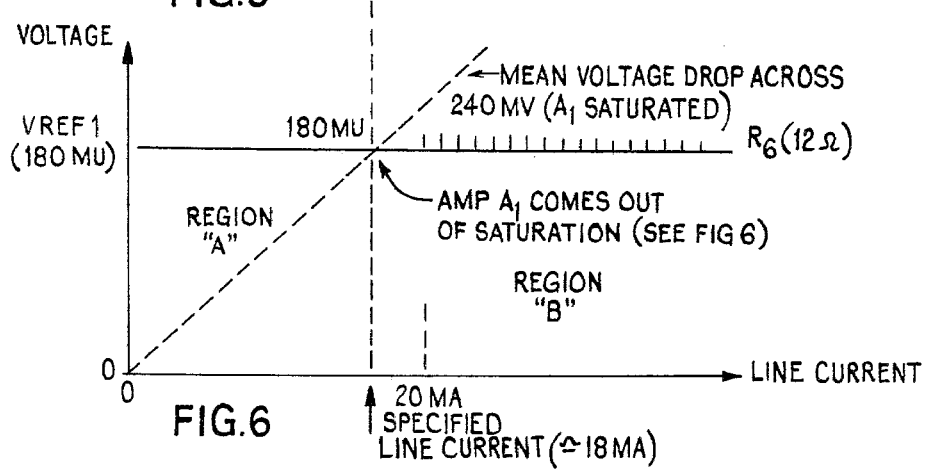
FIG.6
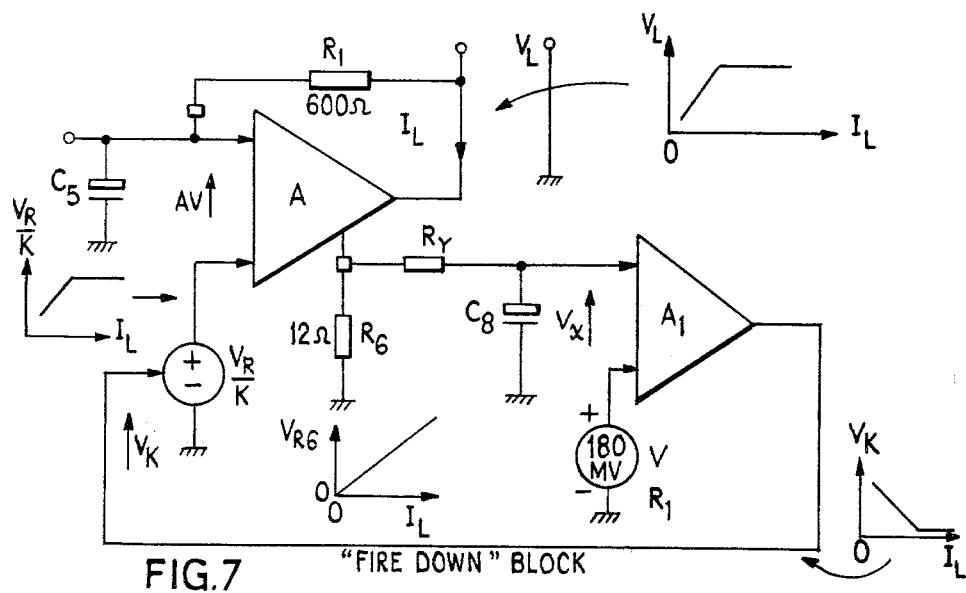
FIG.7 "FIRE DOWN" BLOCK

ELECTRONIC TELEPHONE CIRCUIT

This invention relates to a voltage regulation network, especially for a circuit network in an electronic telephone subscriber's instrument.

In telephone practice, the carbon microphone is established as the international standard to which other instruments are compared. With the introduction of the so-called electronic telephone, i.e. one in which the transducers are used in conjunction with electronic circuitry, a problem arises when an electronic instrument is operated in parallel with a carbon microphone instrument. Naturally if a good performance is to be expected from both telephones when functioning in this parallel mode, the terminal characteristics must be compatible. However, the carbon microphone has a pressure-sensitive resistance which is unpredictable. Its resistance value varies not only with the speech signal, but also with the mean of the pressure wave, the position of the handset, and the time of day.

To further complicate matters, the value of this resistance is so small that when supplied from a long line, in which case line current is low, the voltage developed across the telephone is small, i.e. 1.5 to 2.5 volts. Further, since connections can be made either way, polarity to the telephone instrument may be reversed. One major problem of making an electronic circuit work under possible polarity reversal conditions has been solved by the use of a circuit employing the bridge amplifier, as described and claimed in my co-pending U.S. patent application Ser. No. 20,647, filed Mar. 5, 1979, now U.S. Pat. No. 4,286,123 issued Aug. 25, 1981.

The present invention seeks to provide an improved arrangement for use in an electronic telephone circuit, possibly but not necessarily in association with the circuit arrangement of the above-mentioned application.

According to the present invention there is provided a shunt-voltage regulation circuit including two amplifiers. The first amplifier has one input to which is applied a voltage from a voltage source and to another input of which is applied a first reference voltage so that the output of the first amplifier which provides the regulated circuit output is a voltage dependent on a comparison of said voltages. A feed-back connection is provided from the first amplifier output to the first input of the amplifier and a further output from the first amplifier is applied to a first input of a second amplifier. This last-mentioned output produces a voltage proportional to the output voltage of the first amplifier. The second amplifier has a second input to which is applied a second reference voltage, and a connection is completed from the output of the second amplifier to the source of the first reference voltage via which the said first reference voltage is adjustable in accordance with the value of the output voltage of the said amplifier. Thus, as the current in the circuit to which the regulated output varies, the voltage output of the first amplifier is subject to very small variation above a threshold level, but to relatively large variation below the threshold, the voltage decreasing with current below said threshold.

An embodiment of the invention will now be described with reference to the accompanying drawings, in which:

FIGS. 5 and 6 are further explanatory graphs;

FIG. 7 is a more detailed circuit of an embodiment of the invention; and

To make the present electronic network compatible with a carbon transducer instrument, the system of the above-mentioned application has been used, which gave the electronic telephone instrument a unique current-voltage static characteristic. However, such a telephone instrument with its unusual characteristics, has to cope both with the low voltage imposed on the "electronic" telephone (which may have a "non-carbon" microphone) by the carbon network, but also with large mean fluctuations at low line currents of this terminal voltage due to pressure waves during speech.

Figure 1:
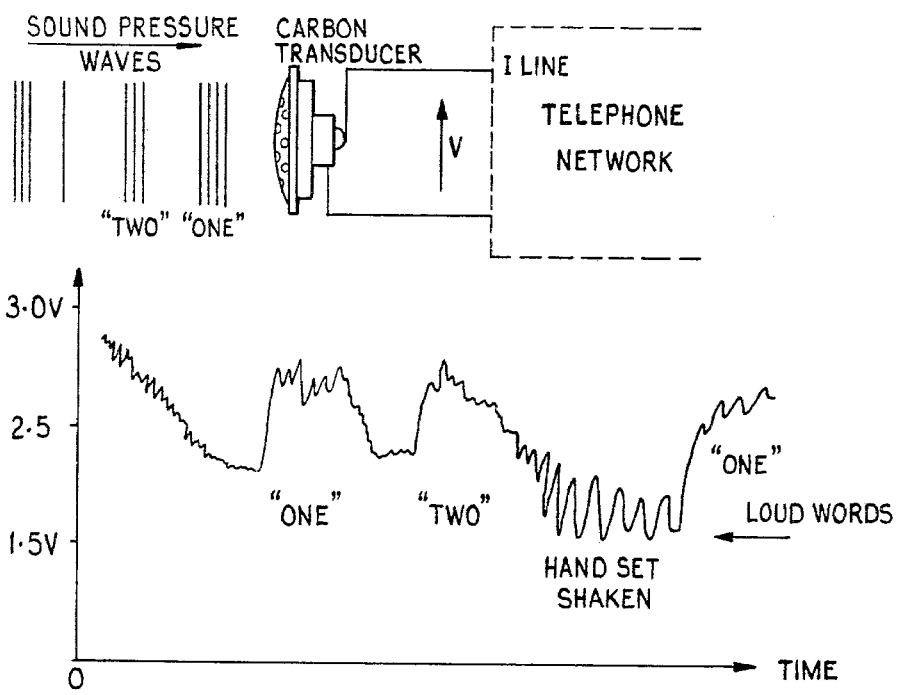
FIGS. 1, 2 and 3 are explanatory graphs.

Such dynamic voltage shift is illustrated in FIG. 1, which in its upper portion diagrammatically represents a carbon transducer with incident sound waves. The graph shows the fluctuating voltage produced across the transducer for the words ONE and TWO, and for the handset being shaken. This curve indicates response to loud words.

Figure 2:
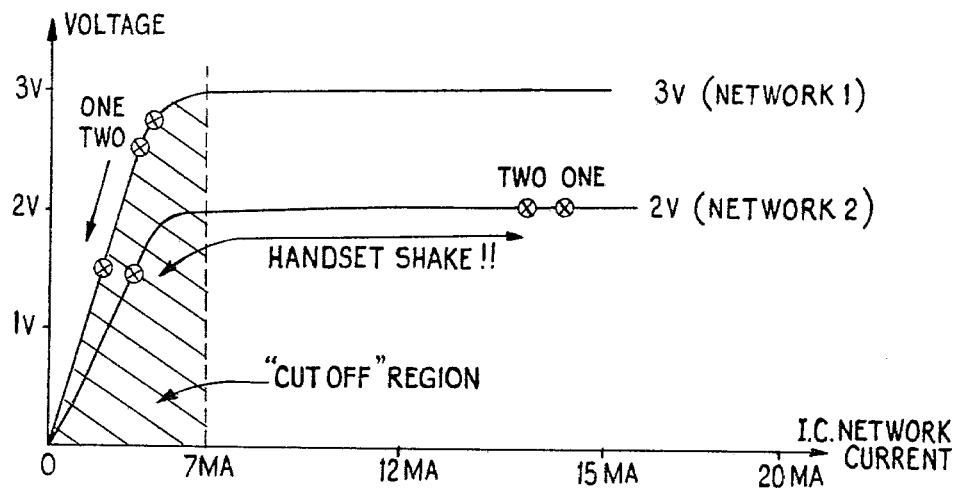

FIG. 2 is the voltage-current characteristic curve for an integrated circuit chip for use in an electronic telephone instrument. Note especially the "cut off" region of the arrangement. Here, a small voltage change across the subset causes large current changes in the electronic network, which is inconvenient for both the electronic network and a carbon transducer in parallel therewith.

There are two curves in FIG. 2, labelled NETWORK 1 and NETWORK 2, for 3 volts and 2 volts respectively across the set in the static state.

In the NETWORK 1 case, the compromise is one of trying to optimize a good signal swing, which increases directly as a function of a voltage drop, against minimizing power dissipation at high line currents, also increased directly as a function of voltage drop. Unfortunately this compromise is good for both signal swing and power dissipation, but as soon as a carbon network is placed in parallel with its microphone, the operating point is forced into the cut-off region.

NETWORK 2 sacrifices the long line swing for improved parallel performance, but even this curve shows difficulties with a shaken hand set which can drive the instrument into its cut-off region as shown by the arrow. It also exhibits difficulties due to low resistance carbon networks.

Figure 3:
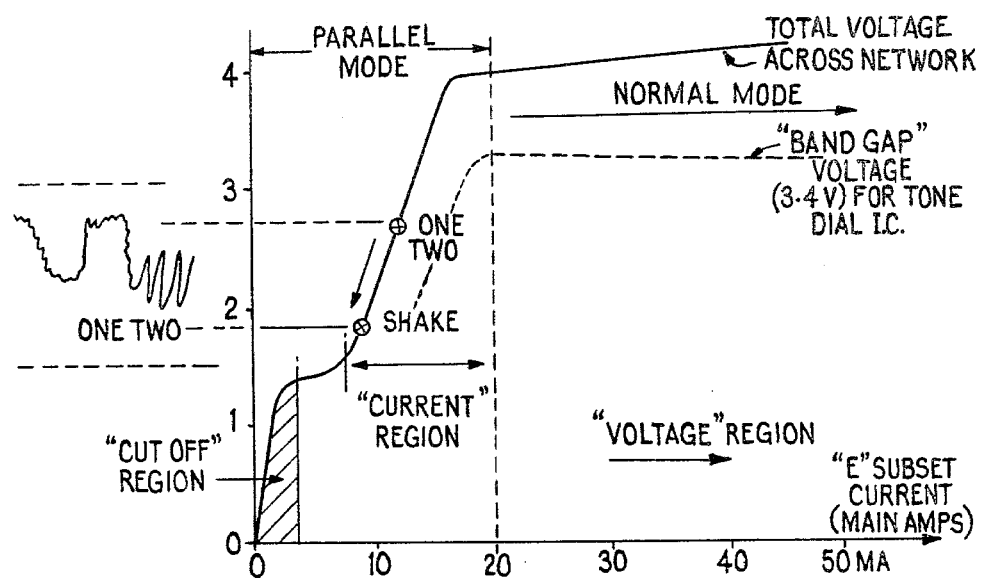

The technique on which the voltage regulator of the present invention is based is that of splitting the operating characteristic into two regions, as will be seen from FIG. 3. The first of these is a constant voltage region at the right-hand side, in which variations in subset current produce very small variations in voltage across the subset, chosen for considerations such as short line dissipation and good signal swing. The other region, between the constant voltage region and the cut-off region is a so-called current region, which enables the voltage across the terminals to vary by up to 1.5 volts with very little difference in the operational conditions of the electronic network.

When a telephone subset circuit includes a shunt voltage regulator with a characteristic of the type shown in FIG. 3, it receives the incoming line current and its output controls the operating conditions of the main amplifier for the subset's microphone, which is assumed not to be a carbon microphone, e.g. it could be a moving coil microphone or an electret microphone. However, the arrangement is also usable in conjunction with a carbon microphone. The manner in which the regulator is used in a subset circuit will become clear from the description of FIG. 8.

With a circuit having the characteristic curve of FIG. 3 is used in a telephone circuit, and parallel operation with a carbon network instrument occurs, the electronic network is never forced into the cut-off region by the large fluctuations in terminal voltage which may occur during speech.

Figure 4:
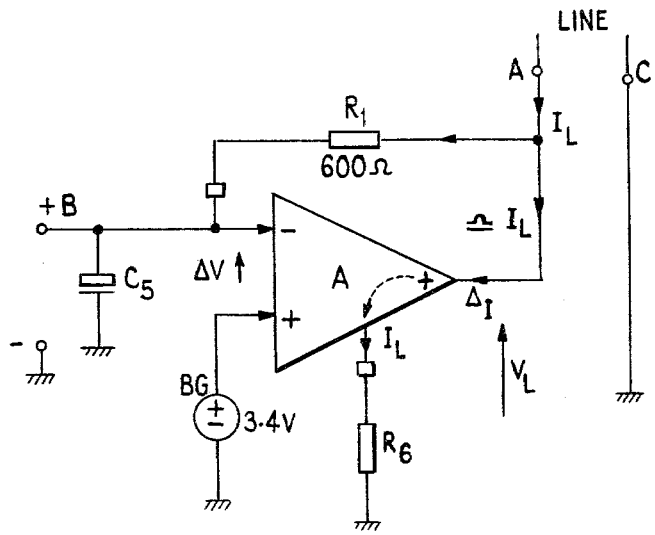
FIG. 4 is a simplified circuit showing an embodiment of the invention.

To produce the current-voltage characteristic of FIG. 3, the electronic network includes two circuit blocks, the first of which is basically a shunt voltage regulator using the band gap reference voltage available in a bipolar integrated circuit. A simple realization of such a circuit is shown in FIG. 4, in which A is a high-gain transconductance amplifier with a high output impedance, of about 20 K ohms, its gain $g_m$ is of the order of 50 amps/volt.

The amplifier A compares the voltage applied to its inverting input from the voltage supply for a dial tone generator with the bandgap reference voltage of 3.4 volts, applied from B G to the non-inverting input of the amplifier. The output of this amplifier is applied to one side of the line, so that the amplifier exerts an influence on the line current $I_L$ and line voltage $V_L$, as indicated on FIG. 4.

The amplifier has a high transconductance $(g_m)$, which, assuming that $I_C = 0$ (where $I_C$ is the current through resistor R1) means that the voltage error V, (equal to $I_L/g_m$) would approach zero (5 mV), so that the terminal current in such case would be zero. If as is the case in practice, $I_C$ is not zero, the voltage across the line is given by:

$$V_L = V_R + I_C R_1$$

where $V_R$ is the reference voltage from BG, and $R_1$ is the feedback resistor of the amplifier A. This it is which explains the small slope in the $I_L - V_L$ characteristics.

One of the requirements of the electronic network is that it should supply up to 1 mA for the line supply referred to above. Using such a system the voltage across capacitor C5 is equal to $V_R$, plus the small error voltage V, even though current is drawn from the node B. Thus the system simply increases the line voltage by an amount $I_T \times R_1$, when the dial tone generator integrated circuit draws its current $I_T$.

In addition to the above indicated requirements of a simple shunt voltage regulation, the circuit has to be able to drive signal onto the line, and the output impedance in the audio frequency band (300—3.4 Khz) should be 600 ohms. In order to induce signal onto the line, an error signal is introduced inside the feedback loop, which is then amplified and fed directly onto the line.

To produce the high current-voltage slope below 20 mA, see FIG. 3, an additional block called a "fire-down" circuit is added. This circuit block is the second block previously referred to. The basic idea behind use of this second circuit block is to change the voltage reference as a function of line current, i.e. the lower the current the lower the reference voltage below a specified line current. The two curves of FIGS. 5 and 6 show the required characteristics, which makes it possible for the full $V_R$ to be available in normal, i.e. non-parallel, operation, i.e. above 20 mA line current.

The combination of fire down block, plus the voltage regulation, is shown in FIG. 7, with some explanatory graphs shown as inserts.

Here the voltage across resistor $R_y$ is the product of the line current $(I_C)$ and the value of $R_1$. When the voltage decreases to equal $V_{R1}$, (the reference voltage for a second amplifier $A_1$) the first amplifier A which was previously saturated begins to amplify the small decreases in $V_{R1}$ causing the output voltage $V_R$ to decrease the voltage reference for the regulator block.

Thus it will be seen that when the line current $I_L$ decreases, the voltage across $R_1$ also decreases, which changes the value of $V_X$ at the input to $A_1$. The amplified version of this voltage $V_X$ is used, via $A_1$, to change the basic voltage $V_L$ which decreases pro rata as the line current decreases.

The threshold for this "fire-down" sequence is set by the voltage reference $V_{R1}$ and the value of the feedback resistor $R_1$. The components $R_Y$ and $C_8$ are not directly involved, but they are necessary when the two blocks are used for the transmission of signals to the line.

Figure 8:
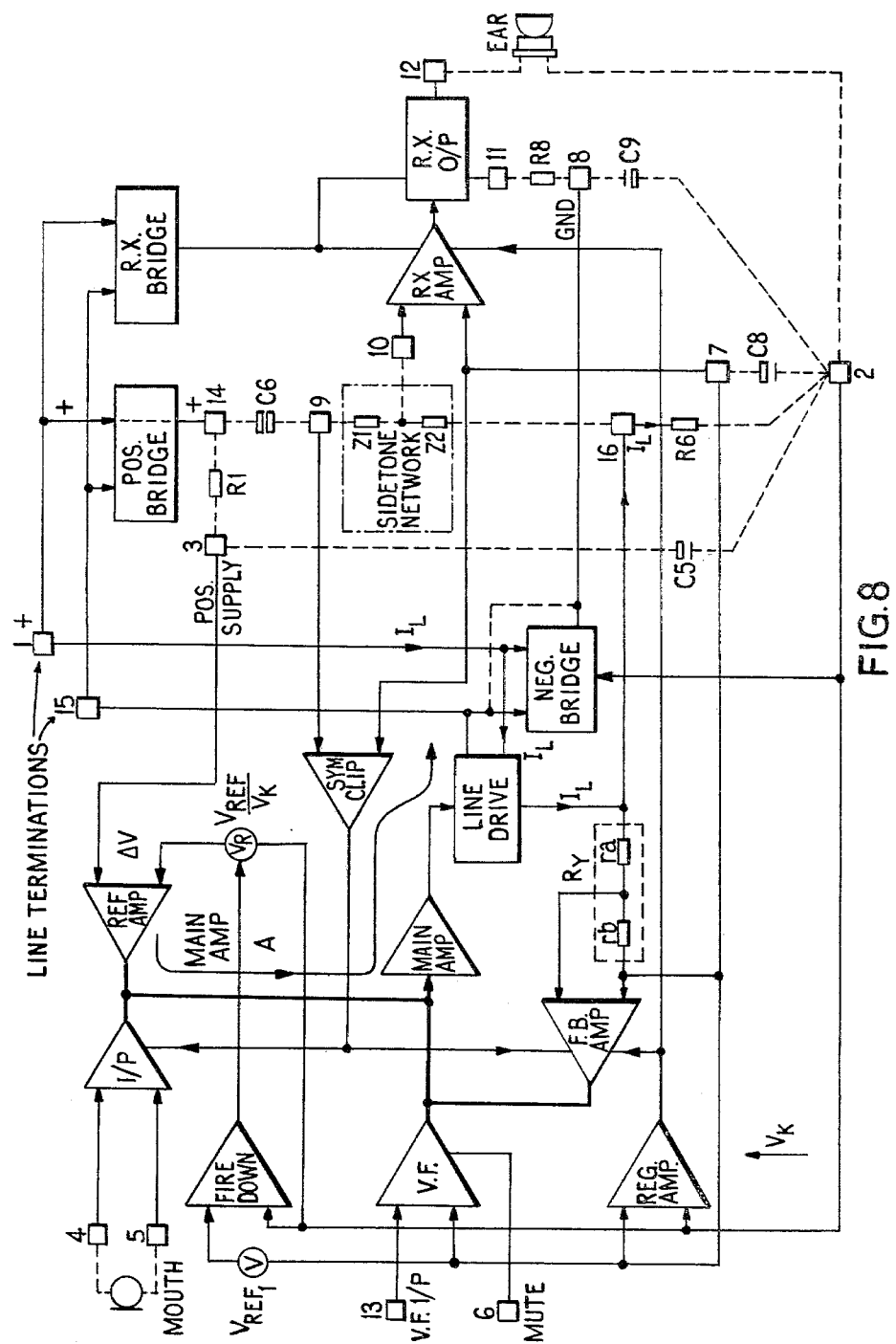
FIG. 8 is a circuit of an electronic telephone instrument using the voltage regulating circuit of the invention, and incorporating the bridge amplifier of my previously mentioned application Ser. No. 20,647.

In the block diagram of FIG. 8, the block labelled POS BRIDGE contains the bridge amplifier described and claimed in my application Ser. No. 20,647, and it produces the positive supply voltage for the circuit from terminal 14 across the resistor R1 (FIG. 7). The speech voltages incoming to the telephone set via the terminals designated LINE TERMINATIONS shown reach the earpiece via terminal 14, capacitor C6, terminal 9, resistor Z1 of the SIDETONE NETWORK, terminal 10, receiver amplifier RX AMP and the receiver output circuit RX O/P. This latter block includes such additional amplification as may be needed.

Note that, due to the characteristics of the bridge amplifier in the block POS BRIDGE, as explained in the above mentioned application, the direct voltage is made available by POS BRIDGE with very small voltage drop from the incoming line voltage. This, as explained in the above-mentioned application, is especially important when the set is connected to a long line, or when the set is parallel with a "non-electronic" telephone set.

The positive supply voltage from terminal 3 is also applied to a reference amplifier REF AMP, where it is compared with an internally generated reference voltage $V_R$. An error signal which results from the difference between the signals at the two inputs to the REF AMP is generated by this comparison at the output of REF AMP to adjust the amplification for outgoing speech and voice frequency signal, via the connection shown from REF AMP to the main amplifier MAIN AMP and LINE DRIVE block. The combination in FIG. 8 of the REF AMP, MAIN AMP and LINE DRIVE form the equivalent of the amplifier A of FIGS. 4 and 7. The circuit which generates the reference voltage $V_R$ is controlled by a "fire down" circuit designated in FIG. 8 as FIRE DOWN which corresponds to the amplifier $A_1$ of FIG. 7.

In correlating FIG. 7 with FIG. 8, there can be seen in FIG. 8 a path from positive supply terminal to the upper input lead of REF AMP. The second input to the REF AMP receives the reference voltage from the output of the FIRE DOWN amplifier. One output of the regulator circuit (Amplifier A of FIG. 7) is coupled from the main output of the LINE DRIVE block through resistance RY to the upper input of the FIRE DOWN amplifier. A further output of the LINE DRIVE to the POSITIVE BRIDGE input 1, comprises the feed back path to the upper lead of the REP AMP including a path through terminal 1, the POS BRIDGE, terminal 14, resistor R1 and terminal 3 at the positive supply.

The LINE DRIVE main output may also be traced through terminal 16 and resistor R6 to ground at terminal 2. The upper input to the FIRE DOWN may also be traced to terminal 7 coupled to ground through capacitor C8. The reference input to the FIRE DOWN amplifier of FIG. 8 is in fact generated inside the FIRE DOWN amplifier and referenced to ground at terminal 2.

The voltage between terminals 7 and 2 (in FIG. 8) is a voltage which corresponds to the mean value of current in resistor R6 and thus controls when the regulator of the present circuit starts to decrease the controlled voltage of the source which in effect appears at terminal 3.

The speech from the microphone passes via an input amplifier I/P, the main amplifier MAIN AMP and line drive circuitry LINE DRIVE to the terminal 16, from which it passes via the SIDETONE NETWORK (Z1-Z2), capacitor C6, terminal 14 and POS BRIDGE to the line. The terminal 9 of the SIDETONE NETWORK is connected via SYM CLIP to the input amplifier I/P to control the latter in accordance with the amplitude at 9, i.e. to give a measure of automatic volume control.

When voice frequency signals usually from a pushbutton key set, have to be sent, these signals reach MAIN AMP via a voice frequency amplifier VF. These signals are muted via the connection shown, in the presence of speech, the means to control the mute input not being shown. Control of the operations of the various circuit elements is also effected, in accordance with line conditions via another amplifier REG AMP.

Finally the blocks labelled RX BRIDGE and NEG BRIDGE perform similar functions to those performed by the blocks RXB and RLB of the circuit shown in FIG. 4 of the above-mentioned application.

It should be noted that when a relatively small circuit assembly such as that of FIG. 7 is configured as a portion of a complex integrated circuit such as that of FIG. 8, rigid terminal to terminal correspondence is not feasible. In addition, the function of the single amplifier A of FIG. 7 may be performed by a plurality of amplifiers in the integrated circuit of FIG. 8, however, the combined amplifier of REF AMP, MAIN AMP and LINE DRIVE performs its combined function in the manner of amplifier A of FIG. 7.

I claim:

1. A shunt voltage regulation circuit for a network external to said circuit, said network adapted for the bidirectional transfer of audio frequency signals, said circuit including a first and a second series coupled comparator amplifiers with both amplifiers having two inputs and at least one output, said first amplifier having a first input coupled to a supply of voltage to said network and a second input coupled to a source of reference voltage whereby an output of said first amplifier is a voltage dependent on the comparison of voltages at said inputs; said output from said first amplifier coupled to said network to supply regulated voltage thereto, a second output of said first amplifier coupled over a path to a first input of said second amplifier to apply a voltage proportional to the output of said first amplifier to said first input to said second amplifier, a second source of reference voltage coupled to the second input of said second amplifier, the output of said second amplifier coupled to the first source of reference voltage to adjust the first reference voltage in accordance with the value of the voltage of the output of said second amplifier representing a comparison between the voltges at the inputs to said second amplifier.

2. A circuit as claimed in claim 1, in which the path from the second output of the first amplifier to the first input of the second amplifier includes a resistive impedance with a capacitor connected from that first input of the second amplifier to a source of ground voltage so that audio frequency signals from said network may be passed via the first amplifier.

3. A circuit as claimed in claim 1, in which there is a feedback connection from the regulated output of the first amplifier to the first input of the first amplifier.

4. A circuit as claimed in claim 1 in which said circuit is fabricated using bipolar integrated circuit techniques and wherein said first reference voltage is derived using available band gap reference of the integrated circuit.

5. A circuit for regulating the voltage in a telephone instrument powered from a two wire line, comprising a source of voltage derived from said line, a first source of reference voltage, a first comparator for comparing the voltages from said sources to produce an output from said comparator in response to a difference between the voltages from said sources, a path for channeling a voltage proportional to said voltage difference to an input of a second comparator, a second input of said second comparator coupled to receive a second reference voltage, said second comparator comparing the voltages at its inputs to produce an output for varying the voltage of said first source of reference voltage accordingly.

6. A circuit for regulating voltage as claimed in claim 5, in which there is a feedback path from the output of said first comparator, said output being coupled to the source of line voltage, to said first input to said first comparator.

7. A circuit as claimed in claim 6, in which the circuit is configured in bipolar integrated circuit form and said first source of reference voltage is derived from band gap voltage available in said integrated circuit.

* * * * *